(12) United States Patent
Lee et al.

(10) Patent No.: US 11,254,016 B2
(45) Date of Patent: Feb. 22, 2022

(54) JOINT MECHANISM, METHOD FOR CONTROLLING THE SAME, MULTI-ARM DEVICE, AND ROBOT

(71) Applicant: GUANGDONG O-MATIC INTELLIGENT ROBOT LIMITED, Foshan (CN)

(72) Inventors: Wai Man Lee, Foshan (CN); Tin Cheung Wong, Shenzhen (CN)

(73) Assignee: GUANGDONG O-MATIC INTELLIGENT ROBOT LIMITED, Foshan (CN)

( * ) Notice: Subject to any disclaimer, the term of this patent is extended or adjusted under 35 U.S.C. 154(b) by 0 days.

(21) Appl. No.: 16/756,856

(22) PCT Filed: Aug. 30, 2018

(86) PCT No.: PCT/CN2018/103218
§ 371 (c)(1),
(2) Date: Apr. 17, 2020

(87) PCT Pub. No.: WO2019/076146
PCT Pub. Date: Apr. 25, 2019

(65) Prior Publication Data
US 2021/0187758 A1 Jun. 24, 2021

(30) Foreign Application Priority Data
Oct. 20, 2017 (CN) .......................... 201710983085.3

(51) Int. Cl.
B25J 17/02 (2006.01)
B25J 9/14 (2006.01)
(Continued)

(52) U.S. Cl.
CPC ........... *B25J 17/0258* (2013.01); *B25J 9/104* (2013.01); *B25J 9/14* (2013.01); *B25J 19/02* (2013.01); *F16D 37/008* (2013.01); *F16D 37/02* (2013.01)

(58) Field of Classification Search
CPC .......... B25J 17/0241; B25J 9/14; B25J 9/104; F16D 37/008; F16D 37/02
See application file for complete search history.

(56) References Cited

U.S. PATENT DOCUMENTS 4,896,754 A * 1/1990 Carlson ................. F16D 37/008
188/267.1
6,293,746 B1 9/2001 Ogawa et al.
(Continued)

FOREIGN PATENT DOCUMENTS

CN 104493836 A 4/2015
CN 104723354 A 6/2015
(Continued)

OTHER PUBLICATIONS

Alex S. Shafer; Mehrdad R. Kermani; Development of high performance intrinsically safe 3-DOF robot; 2014 IEEE International Conference on Robotics and Automation (ICRA); May 31-Jun. 7, 2014; pp. 619-624; IEEE; DOI: 10.1109/ICRA.2014.6906919.

*Primary Examiner* — Jake Cook
*Assistant Examiner* — Gregory Robert Weber
(74) *Attorney, Agent, or Firm* — Soroker Agmon Nordman PTE Ltd

(57) ABSTRACT

The present invention relates to a joint mechanism (100), a method for controlling the joint mechanism (100), a multi-arm device (200) including the joint mechanism (100), and a robot. The joint mechanism (100) comprises: a base (4) having a pivot shaft (41); a swinging arm (1) having a first end (11) mounted on the pivot shall (41); a first driving member (2) and a second driving member (3) mounted on (Continued)

the pivot shall (41) for interacting with the swinging arm (1) through magnetorheological fluid; and a first electromagnetic component (22) and a second electromagnetic component (32), configured to change phase state of the magnetorheological fluid. The first driving member (2) and the second driving member (3) can selectively drive tire swinging arm (1) to rotate along a first direction or a second direction.

10 Claims, 2 Drawing Sheets

(51) Int. Cl.
*B25J 9/10* (2006.01)
*B25J 19/02* (2006.01)
*F16D 37/00* (2006.01)
*F16D 37/02* (2006.01)

(56) References Cited

U.S. PATENT DOCUMENTS

| | | | | |
|---|---|---|---|---|
| 8,127,907 | B1* | 3/2012 | White | F16D 37/008 |
| | | | | 192/21.5 |
| 10,525,588 | B2* | 1/2020 | Plante | B25J 9/104 |
| 2013/0047772 | A1* | 2/2013 | Shafer | B25J 19/06 |
| | | | | 74/490.03 |
| 2015/0107395 | A1* | 4/2015 | Kermani | F16D 37/02 |
| | | | | 74/490.03 |

FOREIGN PATENT DOCUMENTS

| | | | |
|---|---|---|---|
| CN | 107553481 A | | 1/2018 |
| CN | 207509221 U | | 6/2018 |
| JP | S62-264887 A | * | 11/1987 |
| JP | H09-239686 A | * | 9/1997 |
| JP | H09239686 A | | 9/1997 |

* cited by examiner

JOINT MECHANISM, METHOD FOR CONTROLLING THE SAME, MULTI-ARM DEVICE, AND ROBOT

The present application claims priority of Chinese patent application No. 201710983085.3, entitled "Joint mechanism and method for controlling the same, multi-arm device, and robot" and filed on Oct. 20, 2017, the entire content of which is incorporated herein by reference.

TECHNICAL HELD

The invention relates to a joint mechanism, particularly a joint mechanism for a robot, and a method for controlling the joint mechanism. The invention further relates to a multi-arm device including the joint mechanism, and a robot including the joint mechanism or the multi-arm device.

TECHNICAL BACKGROUND

Robots have been widely used in industrial fields. Among others, joint robots are particularly popular due to their many advantages, such as large operating range, flexible movement, compact structure, or the like. The joint of a robot usually includes a rotatable swinging arm, and a driving mechanism for driving the swinging arm into rotation.

In current joint robots, each joint of a robot is directly driven by a motor, for example, a stepper motor, a DC servo motor, an AC servo motor, a hydraulic servo motor, etc. However, due to inherent characteristics of these motors, this design will cause a large inertia of the swinging arm of each joint of the robot, so that it is difficult to achieve high-speed reciprocal swing movement.

SUMMARY OF THE INVENTION

The present invention aims to provide a joint mechanism, winch is capable of realizing rapid changes of movement state of the joint mechanism by means of magnetorheological fluid. The present invention further aims to provide a method for controlling the joint mechanism, a multi-arm device including such a joint mechanism, and a robot including such a joint mechanism or a multi-arm device.

According to a first aspect of the present invention, a joint mechanism is proposed, comprising: a base having a pivot shaft; a swinging arm which is mounted on the pivot shaft at a first end thereof; a first driving member and a second driving member, which are both mounted on the pivot shaft for receiving a driving force from a driving source, wherein the first driving member and the second driving member interact with the swinging arm through magnetorheological fluid, respectively; and a first electromagnetic component and a second electromagnetic component, which are configured to change phase state of the magnetorheological fluid, so that the first driving member and the second driving member can selectively drive the swinging arm to rotate along a first direction or a second direction, wherein the first direction is opposite to the second direction.

The magnetorheological fluid is a kind of suspension formed by dispersing magnetically polarized particles having a size of micron range in a non-magnetic liquid (for example, mineral oil, silicone oil, etc.). When there is no magnetic field, the magnetorheological fluid behaves as a liquid of good flowability, and has a very small apparent viscosity. However, under a strong magnetic field, the apparent viscosity of the magnetorheological fluid will be increased by more than two orders of magnitude in a short time (e.g., in milliseconds), so drat the magnetorheological fluid exhibits solid-like characteristics. Moreover, the change of phase state is continuous and reversible. That is, the magnetorheological fluid will return to its original phase state after the magnetic field is withdrawn. Since the rheology of the magnetorheological fluid under a magnetic field is instantaneous and reversible, and the shear yield strength of the magnetorheological fluid after the rheology maintains a stable corresponding relationship with respect to the strength of the magnetic field, the magnetorheological fluid has been widely used as a smart material with excellent performances. The procedure in which the magnetorheological fluid changes its viscosity as the magnetic field strength changes is often referred to as the phase state change of the magnetorheological fluid.

According to the present invention, in a joint mechanism, particularly a joint mechanism for a robot, the driving members interact (i.e., form a driving connection relationship) with the swinging arm through the magnetorheological fluid, and enable the magnetorheological fluid to experience phase state change by means of the magnetic field generated by the electromagnetic components. When the electromagnetic components do not generate a magnetic field, the magnetorheological fluid behaves as a liquid of good flowability. In this case, no driving connection is formed between any of the driving members and the swinging arm. In other words, the driving members cannot drive the swinging arm into rotation. When any one of the electromagnetic components generates a magnetic field, the magnetorheological fluid experiences change of phase state and thus behaves like a semi-solid. In this case, a driving connection is formed between a corresponding driving member and the swinging arm. That is, the corresponding driving member can drive the swinging arm into rotation. Because the electromagnetic components can be switched on and off in a short time, and the response time of the magnetorheological fluid is also very fast, the driving connection between the driving member and the swinging arm can be established or disappeared in a short time. Therefore, through providing two driving members with different rotation directions and establishing a driving connection between one or two driving members and the swinging arm or not as required, the swinging arm can perform various movements as required, and achieve rapid turnarounds.

In an embodiment, the first driving member and the second driving member define, together with the swinging arm, a closed, fast liquid cavity and a closed, second liquid cavity respectively, which are both filled with the magnetorheological fluid.

In a specific embodiment, the first end of the swinging arm is formed as a sleeve, which is divided into two recesses through a partition wall extending along a radial direction. The open ends of said two recesses are closed by the first driving member and the second driving member respectively, so as to form the first liquid cavity and the second liquid cavity.

In a specific embodiment, the first driving member and the second driving member are each formed as a hollow shaft having an open end and a closed end. The open ends of the first driving member and the second driving member are configured so that the pivot shaft can be mounted thereon, and the closed ends thereof extend into the recesses respectively. Each hollow shaft is provided on an outer periphery thereof with an annular shoulder, which is sealingly connected with the open end of a respective recess through a bearing, for closure of the first liquid cavity or the second liquid cavity.

In an embodiment, the first electromagnetic component and the second electromagnetic component are configured as annular members, which are arranged in the first liquid cavity and the second liquid cavity, respectively, and sleeved on the closed ends of the first driving member and the second driving member, respectively.

In a specific embodiment, portions of the first driving member and the second driving member extending into the recesses are made of soft magnetic material.

In a specific embodiment, the first electromagnetic component and the second electromagnetic component are arranged at a side by the first liquid cavity and the second liquid cavity, respectively.

In an embodiment, the driving source drives the first driving member and the second driving member to rotate in the first direction and the second direction respectively through a transmission mechanism, which is selected from a group consisting of a pulley, a gear, a sprocket and a belt.

In a specific embodiment, the driving source drives the first driving member through a first belt and a first pulley, and drives the second driving member through a second belt and a second pulley. The first belt adopts one of a cross-belt drive mode and an open-belt drive mode, while the second belt adopts the other of the cross-belt drive mode and the open-belt drive mode. Alternatively, the first belt and the second belt both adopt a semi-cross-belt drive mode.

In an embodiment, the first driving member and the second driving member are each provided with a sensor for detecting rotating angle of the swinging arm.

According to a second aspect of the present invention, a multi-arm device is proposed, comprising: a first joint mechanism as mentioned above; and a second joint mechanism as mentioned above, which is arranged at the second end of the swinging arm of the first joint mechanism. The base of the second joint mechanism is formed by the second end of the swinging arm of the fast joint mechanism, and the driving source of the second joint mechanism is formed by the first driving member and the second driving member of the first joint mechanism.

According to a third aspect of the present invention, a method of controlling the joint mechanism as mentioned above is proposed, comprising a step of applying current to the first electromagnetic component and/or the second electromagnetic component to change the phase state of the magnetorheological fluid, so that at least one of the first driving member and the second driving member can selectively drive the swinging arm to rotate along the first direction or the second direction.

In an operation mode of the method, only a first current is applied to the first electromagnetic component, so that the magnetorheological fluid in the first liquid cavity changes its phase state. Accordingly, the first driving member can drive the swinging arm to rotate in the first direction.

In another operation mode of the method, only a second current is applied to the second electromagnetic component, so that the magnetorheological fluid in the second liquid cavity changes its phase state. Accordingly, the second driving member can drive the swinging arm to rotate in the second direction.

In a further operation mode of the method, a third current and a fourth current are continuously applied to the first electromagnetic component and the second electromagnetic component, respectively, so that the magnetorheological fluids in the first liquid cavity and the second liquid cavity both change their phase states. Accordingly, a driving force exerted by the first driving member on the swinging arm is equal to that exerted by the second driving member on the swinging arm, resulting in the swinging arm being at a natural stationary state.

In still a further operation mode, a fifth current and a sixth current are continuously applied to the first electromagnetic component and/or the second electromagnetic component, respectively, so that the magnetorheological fluid in the first liquid cavity and/or the second liquid cavity changes its phase states. Accordingly, a driving force exerted by the first driving member and/or the second driving member on the swinging arm counteracts to a gravity of the swinging arm, resulting in the swinging arm being at a stationary state. The fifth current and the sixth current are both pulse current.

In still a further operation mode, a seventh current and an eighth current are alternately applied to the first electromagnetic component and the second electromagnetic component, so that the magnetorheological fluids in the first liquid cavity and the second liquid cavity change their phase states in an alternate manner. Accordingly, the first driving member and the second driving member drive the swinging arm in an alternate manner, thus generating a reciprocal swing movement of the swinging arm.

According to a fourth aspect of the present invention, there also provides a robot, which includes the joint mechanism as mentioned above, or the multi-arm device as mentioned above.

BRIEF DESCRIPTION OF THE DRAWINGS

In the Following preferred embodiments of the present invention will be described by way of non-limiting examples with reference to the following drawings, in which.

DETAILED DESCRIPTION OF EMBODIMENTS

The present invention will be described in detail below with reference to the drawings.

Figure 1:
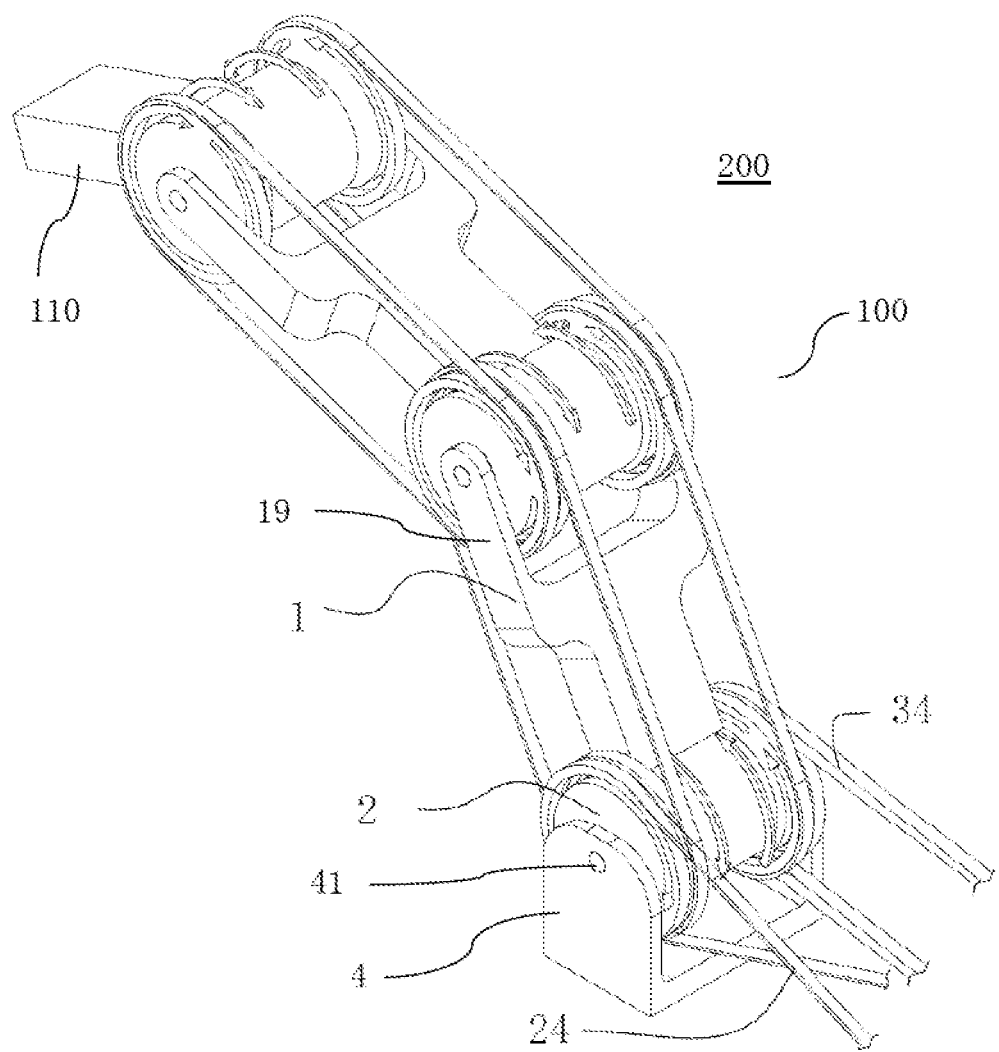
FIG. 1 shows a perspective view of a multi-arm device according to the present invention, which includes two joint mechanisms according to the present invention.

FIG. 1 shows a perspective view of a multi-arm device 200 according to the present invention. As shown in FIG. 1, the multi-arm device 200 includes two joint mechanisms 100 according to the present invention connected to each other. It is easy to understand that the multi-arm device 200 may include more joint mechanisms 100 connected to each other.

Figure 2:
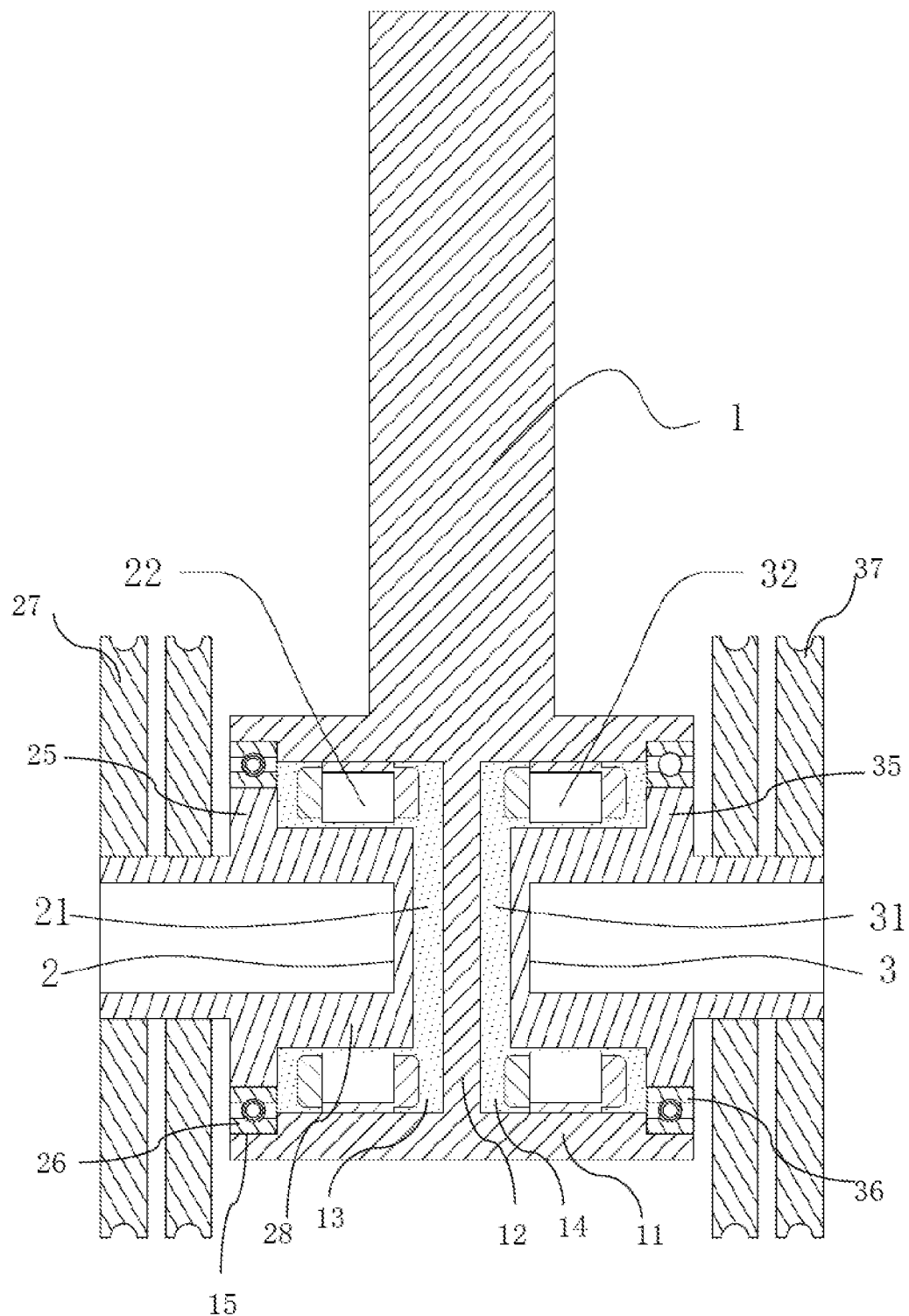
FIG. 2 shows a cross-sectional view of a joint mechanism according to the present invention.

As shown in FIG. 1, the joint mechanism 100 includes a base 4 having a pivot shaft 41, and a swinging arm 1 mounted on the pivot shaft 41. The swinging arm 1 is mounted on the pivot shaft 41 through a first end 11 thereof (see FIG. 2). As shown in FIG. 2, the first end 11 of the swinging arm 1 is formed as a sleeve-shaped structure, the center of which is provided with a partition wall 12 extending in a radial direction. The sleeve-shaped first end 11 is divided into two recesses adjacent to each other in an axial direction by the partition wall 12, namely a first recess and a second recess 14. In the present invention, the terms "axial" and "radial" are defined with respect to the pivot shaft 41. In this case, the pivot shaft 41 actually includes two pivot portions, which are respectively mounted in the first recess 13 and the second recess 14.

According to the present invention, the joint mechanism 100 further includes a first driving member 2 and a second driving member 3, which are mounted side by side on the pivot shaft 41. Both the first driving member 2 and the second driving member 3 can rotate under a driving force from a driving source (not shown). However, the rotation directions of the first driving member 2 and the second driving member 3 are set to be different from each other. In the embodiment as shown in FIG. 1, the first driving member 2 can rotate in a clockwise direction, while the second driving member 3 can rotate in a counterclockwise direction. The driving source may be, for example, a motor.

As shown in FIG. 2, the first driving member 2 is formed as a hollow shaft, one end of which is open and the other end is closed. In this manner, the pivot shaft 41 can extend into the open end of the first driving member 2, so that the first driving member 2 can be mounted on the pivot shaft 41 to rotate about the pivot shaft 41. In addition, the closed end of the first driving member 2 extends into the first recess 13 of the first end 11 of the swinging arm 1, so that the first driving member 2 and the swinging arm 1 together define a closed first liquid cavity 21, which is filled with magnetorheological fluid. In the embodiment as shown in FIG. 2, the first driving member 2 is further provided on the outer periphery thereof with an annular shoulder 25 extending radially outward. The annular shoulder 25 is connected to the first end 11 of the swinging arm 1 through a bearing 26. To this end, a bearing stop 15 for mounting the bearing 26 is provided at the free end of the first recess 13 of the first end 11 of the swinging arm 1. Accordingly, the swinging arm 1 can be rotated under the driving force of the first driving member 2. For sealing purposes, a sealing element (not shown) is provided at the bearing 26.

It can be known from the foregoing that the first driving member 2 and the swinging arm 1 can interact with each other through the magnetorheological fluid in the first liquid cavity 21, so as to establish a driving connection relationship.

According to the illustrated embodiment of the present invention, a first electromagnetic component 22 is provided in the first liquid cavity 21. The first electromagnetic component 22 can be configured, for example, as a ring-shaped member, which is sleeved on a portion 28 of the first driving member 2 extending into the first recess 13. In an embodiment not shown, the first electromagnetic component 22 is not disposed in the first liquid cavity 21, but out of the first liquid cavity 21, for example, at a side by the first liquid cavity 21. It is easy to understand that as long as the first electromagnetic component 22 can act on the magnetorheological fluid in the first liquid cavity 21 for changing its phase state, the position thereof can be arbitrarily selected by those skilled in the art according to the needs of the specific structure. However, the arrangement of the first electromagnetic component 22 in the first fluid cavity 21 can enable the structure of the entire joint mechanism 100 more compact, and the effect of the first electromagnetic component 22 on the magnetorheological fluid is more direct. Therefore, this arrangement is preferred.

In one embodiment, the first electromagnetic component 21 may be formed by a stator of a motor, which can be directly sleeved on the portion 28 of the first driving member 2 extending into the first recess 13, so that the assembly is very simple. In addition, ready-made, high-quality stator of the motor can be obtained directly in markets. Therefore, it is unnecessary to design the stator independently, thus saving a large part of the cost. Of course, a shaftless motor stator can also be used.

The first driving member 2 and the second driving member 3 have similar structures. Therefore, it is easy to understand that the description on the structure of the first driving member 2 can be similarly applicable to the second driving member 3. Specifically, the second driving member 3 is also formed as a hollow shaft, with an open end and a closed end. The pivot shaft 41 extends into the open end of the second driving member 3, so that the second driving member 3 can be mounted on the pivot shaft 41 to rotate about the pivot shaft 41. In addition, the closed end of the second driving member 3 extends into the second recess 14, so that the second driving member 3 and the swinging arm 1 together define a closed second liquid cavity 31, which is filled with magnetorheological fluid. In the embodiment as shown in FIG. 2, the second driving member 3 is further provided on the outer periphery thereof with an annular shoulder 35 extending radially outward. The annular shoulder 35 is connected to the first end 11 of the swinging arm 1 through a bearing 36. To this end, a bearing stop for mounting the bearing 36 is provided at the free end of the second recess 14 of the first end 11 of the swinging arm 1. Accordingly, the swinging arm 1 can be rotated under the driving force of the second driving member 3. For sealing purposes, a sealing element (not shown) is provided at the bearing 36. Accordingly, the second driving member 3 and the swinging arm 1 can interact with each other through the magnetorheological fluid in the second liquid cavity 31, so that a driving connection relationship can be established.

According to the illustrated embodiment of the present invention, a second electromagnetic component 32 is provided in the second liquid cavity 31. The second electromagnetic component 32 can be configured as a ring-shaped member, which is sleeved on a portion of the second driving member 3 extending into the second recess 14. It is easy to understand that as long as the second electromagnetic component 32 can act on the magnetorheological fluid in the second liquid cavity 31 to change its phase state, it can be arranged at another position. Similarly, the second electromagnetic component 31 may be formed by a stator of a motor.

According to the present invention, when the first electromagnetic component 31 or the second electromagnetic component 32 is not energized so that no magnetic field is generated, the magnetorheological fluid in the first liquid cavity 21 or the second liquid cavity 31 will act as liquid with excellent flowability. In this case, no driving connection will be established between the first driving member 2 or the second driving member 3 and the swinging arm 1. That is, even if the first driving member 2 or the second driving member 3 rotates, the swinging arm 1 will not be driven into rotation. However, when the first electromagnetic component 31 or the second electromagnetic component 3 is energized to generate a magnetic field, the magnetorheological fluid in the first liquid cavity 21 or the second liquid cavity 31 will act as solid under the influence of the magnetic field. In this case, a driving connection will be established between the first driving member 2 or the second driving member 3 and the swinging arm 1. That is, if the first driving member 2 or the second driving member 3 rotates, the swinging arm 1 is driven into rotation.

As shown in FIG. 1, in the case where a driving connection is established between the first driving member 2 and the swinging arm 1, the swinging arm 1 will rotate clockwise when the first driving member 2 rotates clockwise. In the case where a driving connection is established between the second driving member 3 and the swinging arm 1, the swinging arm 1 will rotate counterclockwise when the second driving member 3 rotates counterclockwise. Since the magnetorheological fluid has a very fast response speed, the swinging arm 1 can follow the first driving member 2 or the second driving member 3 very quickly to rotate in two different directions of rotation. Therefore, through appropriately controlling the rotation directions of the first driving member 2 and the second driving member 3 and the ON/OFF states of the first electromagnetic component 22 and the second electromagnetic component 32, the joint mechanism 100 according to the present invention can realize forward rotation and reverse rotation of the swinging arm 1, as well as fast switching between two different rotation directions. The specific movement modes of the joint mechanism 100 according to the present invention will be described in detail below.

In a preferred embodiment, portions of the first driving member 2 and the second driving member 3 that extend into the first recess 13 and the first recess 14 respectively may be made of soft magnetic material, so as to facilitate the transmission of magnetic force.

In another preferred embodiment, an encoder and a code reader may be provided on the first driving member 2 and the second driving member 3, so that the rotation angle of the swinging arm can be read and controlled.

According to the present invention, the driving source is connected to the first driving member 2 or the second driving member 3 through a transmission mechanism, so that the driving force can be transmitted to the first driving member 2 or the second driving member 3 to drive the first driving member 2 or the second driving member 3 into rotation. Preferably, the transmission mechanism may be a pulley, a gear, a sprocket, a timing belt, or the like. Therefore, the inertia of the entire driving structure is very small, which is favorable for the swinging arm 1 to switch its moving direction rapidly.

In the illustrated embodiment, the transmission mechanism is a pulley and a transmission belt. Specifically, the driving source drives the first driving member 2 through a first driving belt 24 and a first driving pulley 27 that cooperates therewith, and drives the second driving member 3 through a second driving belt 34 and a second driving pulley 37 that cooperates therewith. In one embodiment, as shown in FIG. 1, the first driving belt 24 adopts a cross-belt drive, while the second driving belt 34 adopts open-belt drive, so that the rotation directions of the first driving member 2 and the second driving member 3 are opposite to each other. With this design, two side-by-side pulleys can be arranged on the rotating shaft of the driving source, so that no additional steering mechanism is necessary to ensure the rotation direction of the first driving member 2 is opposite to that of the second driving member 3. This design has a simple structure, low cost, and small footprint.

If is easy to understand that the first transmission belt 24 can adopt open-belt drive while the second transmission belt 34 adopt cross-belt drive, which can also achieve the above-mentioned effect.

In another embodiment, the first driving belt 24 adopts a semi-cross-belt drive, and the second driving belt 34 also adopts a semi-cross-belt drive, thereby ensuring that the rotation direction of the first driving member 2 is opposite to that of the second driving member 3. With this arrangement, the rotation shaft of the driving source can be allowed to be set in any direction, and the problem of self-friction caused by the cross-belt drive of the transmission belt can also be avoided.

In another embodiment, the transmission mechanism is a gear set. One skilled in the art can easily understand that by appropriately selecting the number of gears in the gear set, the rotation direction of the first driving member 2 can be opposite to that of the second driving member 3. This design also provides great flexibility for the arrangement of the rotation shaft of the drive source.

In the following the method of controlling the joint mechanism 100 is described.

As described above, by applying a current to the first electromagnetic component 22 and/or the second electromagnetic component 32, the magnetorheological fluid in the first liquid cavity 21 and/or the second liquid cavity 31 will change its phase state, so that the first driving member 2 and/or the second driving member 3 can selectively drive the swinging arm 1 to rotate in the first direction and the second direction, respectively. The joint mechanism 100 according to the present invention is particularly capable of operating in several operation modes as described below.

In a first operation mode, only a first current is applied to the first electromagnetic component 22, so that the magnetorheological fluid in the first liquid cavity 21 is in a phase state of high viscosity. In this way, a driving connection is established only between the first driving member 2 and the swinging arm 1. Accordingly, the first driving member 2 can drive the swinging arm 1 to rotate in a first direction, i.e., the clockwise direction in the illustrated embodiment.

In a second operation mode, only a second current is applied to the second electromagnetic component 32, so that the magnetorheological fluid in the second liquid cavity 31 is in a phase state of high viscosity. In this way, a driving connection is established only between the second driving member 3 and the swinging arm 1. Accordingly, the second driving member 3 can drive the swinging arm 1 to rotate in the second direction, i.e., the counterclockwise direction in the illustrated embodiment.

In a third operation mode, a third current and a fourth current are continuously applied to the first electromagnetic component 22 and the second electromagnetic component 32, respectively. In this way, the magnetorheological fluids in the first liquid cavity 21 and the second liquid cavity 31 are each in a phase state of high viscosity, so that driving connections are established between the first driving member 2 and the swinging arm 1, and also between the second driving member 3 and the swinging arm 1. By appropriately selecting the magnitudes of the third current and the fourth current, the driving force exerted by the first driving member 2 on the swinging arm 1 can be made equal to that exerted by the second driving member 3 on the swinging arm 1, resulting in the swinging arm 1 being at a natural stationary state. Preferably, the third current is less than or equal to the first current, and the fourth current is less than or equal to the second current.

In the fourth operation mode, a fifth current and a sixth current are continuously applied to the first electromagnetic component 22 and or the second electromagnetic component 32, respectively. In this way, the magnetorheological fluids in the first liquid cavity 21 and the second liquid cavity 31 are each in a phase state of high viscosity, so that driving connections are established between the first driving member 2 and the swinging arm 1, and also between the second driving member 3 and the swinging arm 1. By appropriately selecting the magnitudes of the fifth current and the sixth current, the driving force exerted by the first driving member 2 and/or the second driving member 3 on the swinging arm 1 can counteract to the gravity of the swinging arm 1, resulting in the swinging arm 1 being at a stationary state. Preferably, the fifth current and the sixth current are both pulse current.

In the fifth operation mode, a seventh current and an eighth current are alternately applied to the first electromagnetic component 22 and the second electromagnetic component 32. In this way, the magnetorheological fluids in the first liquid cavity 21 and the second liquid cavity 31 present a highly viscous state alternatively, so that driving connections are established between the first driving member 2 and the swinging arm 1 and between the second driving member 3 and the swinging arm 1 in an alternate manner. Therefore, the first driving member 2 and the second driving member 3 can alternately drive the swinging arm 1 to rotate in different directions. That is, a reciprocating swing movement of the swinging arm 1 is realized.

One or more of the above operation modes may be selected in sequence according to actual needs, so that various functions of the swinging arm 1 as required can be achieved.

The multi-arm device 200 according to the present invention may include a plurality of joint mechanisms 100 connected to each other. In the embodiment as shown in FIG. 1, two joint mechanisms 100 are connected to each other. In order to simplify the structure, the second end 19 of the swing arm 1 of an upstream joint mechanism 100 is formed as the base of a downstream joint mechanism 100. In addition, the transmission mechanism of the downstream joint mechanism 100 is connected to the first driving member 2 and the second driving member 3 of the upstream joint mechanism 100. That is, the first driving member 2 and the second driving member 3 of the upstream joint mechanism 100 act as the driving source of the downstream joint mechanism 100. When the multi-arm device 200 includes a plurality of joint mechanisms 100, these joint mechanisms 100 are connected one by one in sequence as described above. An arm 110 serving as an end effector may be arranged on the last joint mechanism 100 (i.e., the upper one in FIG. 1).

With this design, the multi-arm device 200 has a very compact structure, and can achieve a more complex movement. In addition, only one driving source that provides a driving force for the first joint mechanism 100 is required to drive all the joint mechanisms. Therefore, the cost of the multi-arm device 200 is cut down, and the power consumption thereof is also greatly reduced.

According to another aspect of the present invention, there also provides a robot, which includes the joint mechanism 100 according to the present invention, or the multi-arm device 200 according to the present invention. The robot may be a single-joint robot, or a multi-joint robot.

Finally, it should be noted that the above descriptions are merely preferred embodiments of the present invention, and do not restrict the present invention in any manner. Although the present invention has been described in detail with reference to the foregoing embodiments, those skilled in the art can still modify the technical solutions described in the foregoing embodiments or substitute equivalent technical features therein. Any modification, equivalent replacement, or improvement made within the spirit and principle of the present invention shall fall within the protection scope of the present invention.

The invention claimed is:

1. A joint mechanism (100), comprising:
a base (4) having a first and a second pivot shaft (41);
a swinging arm (1) which is mounted on the pivot shaft (41) at a first end (11) thereof;
a first driving member (2) and a second driving member (3), which are each mounted on one of the first and the second pivot shaft (41) for receiving a driving force from a driving source, wherein the first driving member (2) and the second driving member (3) interact with the swinging arm (1) through magnetorheological fluid, respectively; and
a first electromagnetic component (22) and a second electromagnetic component (23), which are configured to change phase state of the magnetorheological fluid, so that the first driving member (2) and the second driving member (3) can selectively drive the swinging arm (1) to rotate along a first direction or a second direction, wherein the first direction is opposite to the second direction,
wherein the first driving member (2) and the second driving member (3) define, together with the swinging arm (1), a closed, first liquid cavity (21) and a closed, second liquid cavity (31) respectively, which are both filled with the magnetorheological fluid,
and further wherein the first end (11) of the swinging arm (1) is formed as a sleeve, which is divided into two recesses (13, 14) through a partition wall (12) extending along a radial direction, and
wherein open ends of said two recesses (13, 14) are closed by the first driving member (2) and the second driving member (3) respectively, so as to form the first liquid cavity (21) and the second liquid cavity (31).

2. The joint mechanism according to claim 1, wherein the first driving member (2) and the second driving member (3) are each formed as a hollow shaft having an open end and a closed end,
the open ends of the first driving member (2) and the second driving member (3) are configured so that the pivot shaft (41) can be mounted thereon, and the closed ends thereof extend into the recesses (13, 14) respectively, and
each hollow shaft is provided on an outer periphery thereof with an annular shoulder (25, 35), which is sealingly connected with the open end of a respective recess (13, 14) through a bearing (26, 36), for closure of the first liquid cavity (21) or the second liquid cavity (31).

3. The joint mechanism according to claim 2, wherein the first electromagnetic component (22) and the second electromagnetic component (23) are configured as annular members, which are arranged in the first liquid cavity (21) and the second liquid cavity (31), respectively, and sleeved on the closed ends of the first driving member (2) and the second driving member (3), respectively.

4. The joint mechanism according to claim 2, wherein portions of the first driving member (2) and the second driving member (3) extending into the recesses are made of soft magnetic material.

5. The joint mechanism according to claim 1, wherein the first electromagnetic component (22) and the second electromagnetic component (32) are arranged at a side of the first liquid cavity (21) and the second liquid cavity (31), respectively.

6. The joint mechanism according to claim 1, wherein the driving source drives the first driving member (2) and the second driving member (3) to rotate in the first direction and the second direction respectively through a transmission mechanism, which is selected from a group consisting of a pulley, a gear, a sprocket and a belt.

7. The joint mechanism according to claim 6, wherein the driving source drives the first driving member (2) through a first belt and a first pulley, and drives the second driving member (3) through a second belt and a second pulley, and wherein the first belt adopts one of a cross-belt drive mode and an open-belt drive mode, while the second belt adopts the other of the cross-belt drive mode and the open-belt drive mode.

8. A multi-arm device (20), comprising:
a first joint mechanism according to claim 1; and
a second joint mechanism according to claim 1, which is arranged at a second end (19) of the swinging arm (1) of the first joint mechanism,
wherein the base of the second joint mechanism is formed by the second end (19) of the swinging arm (1) of the first joint mechanism, and the driving source of the second joint mechanism is formed by the first driving member (2) and the second driving member (3) of the first joint mechanism.

9. A method of controlling the joint mechanism according to claim 1, comprising a step of:
applying current to the first electromagnetic component (22) and/or the second electromagnetic component (23) to change the phase state of magnetorheological fluid, so that at least one of the first driving member (2) and the second driving member (3) can selectively drive the swinging arm (1) to rotate along the first direction or the second direction.

10. The method according to claim 9, wherein the method includes any one or more of operation modes as follows:
a first operation mode, in which only a first current is applied to the first electromagnetic component (22), so that the magnetorheological fluid in the first liquid cavity changes its phase state, resulting in that the first driving member (2) can drive the swinging arm (1) to rotate in the first direction;
a second operation mode, in which only a second current is applied to the second electromagnetic component (32), so that the magnetorheological fluid in the second liquid cavity changes its phase state, resulting in that the second driving member (3) can drive the swinging arm (1) to rotate in the second direction;
a third operation mode, in which a third current and a fourth current are continuously applied to the first electromagnetic component (22) and the second electromagnetic component (32), respectively, so that the magnetorheological fluids in the first liquid cavity (21) and the second liquid cavity (31) both change their phase states, and a driving force exerted by the first driving member (2) on the swinging arm (1) is equal to that exerted by the second driving member (3) on the swinging arm (1), resulting in the swinging arm (1) being at a natural stationary state;
a fourth operation mode, in which a fifth current and a sixth current are continuously applied to the first electromagnetic component (22) and/or the second electromagnetic component (32), respectively, so that the magnetorheological fluid in the first liquid cavity (21) and/or the second liquid cavity (31) changes its phase states, and a driving force exerted by the first driving member (2) and/or the second driving member (3) on the swinging arm (1) counteracts to a gravity of the swinging arm (1), resulting in the swinging arm (1) being at a stationary state, the fifth current and the sixth current being pulse current; and
a fifth operation mode, in which a seventh current and an eighth current are alternately applied to the first electromagnetic component (22) and the second electromagnetic component (32), so that the magnetorheological fluids in the first liquid cavity (21) and the second liquid cavity (31) change their phase states in an alternate manner, and the first driving member (2) and the second driving member (3) drive the swinging arm (1) in an alternate manner, thus generating a reciprocating swing movement of the swinging arm (1).

* * * * *